(12) United States Patent
Rella et al.

(10) Patent No.: US 11,035,728 B2
(45) Date of Patent: Jun. 15, 2021

(54) CAVITY RING-DOWN SPECTROSCOPY HAVING INTERLEAVED DATA ACQUISITION FOR INTERFERENCE MITIGATION

(71) Applicant: Picarro, Inc., Santa Clara, CA (US)

(72) Inventors: Chris W. Rella, Sunnyvale, CA (US); Hongbing Chen, Sunnyvale, CA (US); Derek Gregory Fleck, Fremont, CA (US); John A. Hoffnagle, San Jose, CA (US); James Ian Lee, San Jose, CA (US); Gerald Thomas Sorensen, Newark, CA (US); Sze Meng Tan, Santa Clara, CA (US)

(73) Assignee: Picarro, Inc., Santa Clara, CA (US)

( * ) Notice: Subject to any disclaimer, the term of this patent is extended or adjusted under 35 U.S.C. 154(b) by 0 days.

(21) Appl. No.: 16/399,431

(22) Filed: Apr. 30, 2019

(65) Prior Publication Data
US 2020/0049556 A1    Feb. 13, 2020

Related U.S. Application Data

(60) Provisional application No. 62/716,086, filed on Aug. 8, 2018.

(51) Int. Cl.
*G01J 3/02* (2006.01)
*G01J 3/433* (2006.01)

(52) U.S. Cl.
CPC ............. *G01J 3/0297* (2013.01); *G01J 3/433* (2013.01); *G01J 2003/4332* (2013.01)

(58) Field of Classification Search
None
See application file for complete search history.

(56) References Cited

U.S. PATENT DOCUMENTS

| 5,185,645 | A | * | 2/1993 | Sartorius | G01B 11/0625 356/432 |
|---|---|---|---|---|---|
| 8,982,352 | B1 | * | 3/2015 | Hoffnagle | G01J 3/42 356/437 |
| 9,116,042 | B1 | * | 8/2015 | He | G01J 3/0224 |
| 9,267,880 | B1 | * | 2/2016 | Tan | G01J 3/42 |
| 2004/0065816 | A1 | | 4/2004 | Ye | |
| 2012/0242997 | A1 | * | 9/2012 | He | G01J 3/28 356/451 |

(Continued)

OTHER PUBLICATIONS

Gotti, Riccardo, et al. "Conjugating precision and acquisition time in a Doppler broadening regime by interleaved frequency-agile rapid-scanning cavity ring-down spectroscopy." The Journal of Chemical Physics 147.13 (2017): 134201. (Year: 2017).*

(Continued)

*Primary Examiner* — Shawn Decenzo
(74) *Attorney, Agent, or Firm* — Lumen Patent Firm (57) ABSTRACT

Interleaved data acquisition in optical spectroscopy is used to provide interference correction for time-varying interference. Measurements at a reference frequency are used to provide an estimate of the interference. These reference measurements are interleaved with the remaining measurements in order to provide estimates of the interference vs. time at relevant times. The interference being corrected can be spectrally structured or unstructured.

15 Claims, 8 Drawing Sheets

(56) References Cited

U.S. PATENT DOCUMENTS

2015/0185141 A1* 7/2015 Fermann ............... H01S 3/0092
356/451
2019/0128799 A1* 5/2019 Leen ........................ G01J 3/42

OTHER PUBLICATIONS

Courtois et al., "Differential cavity ring-down spectroscopy", 2013, JOSA-B v30n6, 1486.

Huang et al., "Long-term stability in continuous wave cavity ringdown spectroscopy experiments", 2010, Applied Optics v49118, 1378.

Martin et al., "The application of a cavity ring-down spectrometer to measurement of ambient ammonia using traceable primary standard gas mixtures", 2016, Applied Physics B 122:219.

* cited by examiner

CAVITY RING-DOWN SPECTROSCOPY HAVING INTERLEAVED DATA ACQUISITION FOR INTERFERENCE MITIGATION

CROSS REFERENCE TO RELATED APPLICATIONS

This application claims the benefit of U.S. provisional patent application 62/716,086, filed on Aug. 8, 2018, and hereby incorporated by reference in its entirety.

FIELD OF THE INVENTION

This work applies to trace gas detection by optical absorption spectroscopy.

BACKGROUND

In the optical absorption technique a light source, commonly a laser, is tuned to an absorption feature of the analyte to be detected and the absorption coefficient of the sample is a quantitative measure of the amount of analyte present. CRDS (cavity ring-down spectroscopy) measures the total loss of an optical cavity containing the sample. Total loss has contributions from empty cavity loss and from optical absorption due to the analyte, as well as optical absorption due to any other molecule that may be present in the sample and that absorbs at the same frequency as the sample. It is therefore necessary to distinguish absorption by the analyte from other sources of optical loss. This is commonly done by probing multiple frequencies spanning a distinctive spectral feature of the analyte. In this way one acquires a data set describing the cavity loss as a function of optical frequency. Comparison of the measured data set to a spectral model including the known frequency dependences of loss due to the empty cavity, the analyte, and any other known absorbers allows one to deduce the contribution of the analyte alone, and from that the analyte concentration. It is inherent in the CRDS method that loss measurements are made sequentially, first at one optical frequency, then at another, then another, etc. until a full data set has been acquired, with loss vs. frequency being characterized over the entire spectral region of interest.

One source of systematic error in optical trace gas detection is referred to as optical interference and arises from absorption by molecules other than the analyte which are present in the sample. Such interference can be unstructured or structured. Unstructured interference means that the absorption from the interfering species has negligible dependence on optical frequency over the range of frequencies that appear in the data set. Structured interference has non-negligible dependence on optical frequency over the range of frequencies that appear in the data set.

Unstructured interference is commonly due to volatile organic compounds with more than a few carbon atoms, such as the vapors of organic solvents, heavy alkanes and alkenes, aromatics, etc. In heavily contaminated samples, absorption by organic contaminants can be thousands of times greater than the sensitivity limit of the analyzer itself. If the concentration of the contaminant molecule(s) were constant in time, unstructured interference would manifest itself simply as a baseline shift, which could easily be handled in the data analysis.

More serious problems occur, however, when the concentration of the contaminant varies with time, and unfortunately this situation is a common one. In a laboratory or industrial setting, for instance, a turbulent air stream flowing over a pool of organic solvent can present a sample with wildly varying solvent concentration. Since CRDS, as explained above, acquires the loss vs. frequency spectra point-by-point, and since each loss measurement includes a background that can be much greater than the absorption we wish to measure, it follows that if that background is fluctuating on the time scale of the data acquisition, then the acquired spectrum will be badly distorted and the comparison to a spectral model will give erratic results. In other words, the time-variation of the interference loss is mapped into a spectral variation by the time sequence of CRDS absorption measurements.

The challenge of a fluctuating interference is especially acute in high gas flow systems where the exchange time of the gas in the cavity is shorter than the spectral scanning time. High gas flow is necessary to measure fast fluctuations in the concentration of the primary target analyte, but can distort spectra due to rapidly fluctuating concentration of other molecules in the gas matrix. In principle, the effect of fluctuating interference can be mitigated by decreasing the spectral measurement interval so that the spectrometer collects complete spectrum in a time that is much less than the gas exchange time of the cavity. In practical CRD spectrometers, operating at a ringdown rate of ~100 ringdowns/sec, and with a gas exchange time of 0.2 seconds, this strategy would lead to a sparse spectrum that would deliver unacceptably poor measurements of the target analyte concentration.

Accordingly, it would be an advance in the art to provide improved optical absorption spectroscopy in the presence of time-varying optical interference.

SUMMARY

To improve the accuracy of CRDS in the presence of fluctuating unstructured or structured interference, we have developed a new method of data acquisition, described below. The method has been shown to improve performance when analyzing samples that are heavily loaded with fumes from solvents such as acetone and isopropyl alcohol or with gaseous alkanes.

In this work we intersperse the measurements of cavity loss at optical frequencies covering the absorption feature of the analyte, the same frequency region that would be probed in conventional CRDS, with loss measurements that are all made at a reference frequency. The concept is easiest to appreciate for the case of unstructured interference, so that case will be considered first. In the most straightforward implementation, the reference frequency is one chosen to be sensitive to unstructured absorption and insensitive to absorption due to the analyte or other small molecules, but it is also possible to choose a reference frequency at which the analyte absorbs—the key point is that the interference is measured and remeasured at the same reference frequency while the full spectrum is acquired.

The data set acquired in this way has two subsets of ring-down data points: one, which we can refer to as the "frequency-scanned" data set contains the same loss vs. frequency information that conventional CRDS would provide; the other "interference" data set measures the cavity loss at the same reference frequency during the entire interval when the frequency-scanned data set was acquired. By using current-tuned semiconductor lasers, we can rapidly switch the laser frequency back and forth between the reference frequency and the frequencies belonging to the frequency-scanned data set. Each ring-down measurement includes, among other data, the cavity loss, optical frequency of the laser at the time the ring-down was initiated, and a time stamp (accurate in our implementation to 1 ms) specifying when the ring-down was initiated.

To analyze the resulting data we first consider the interference data set alone and generate an interpolating function for the interference level as a function of time. This could be as simple as low-order polynomial describing the interference data set or a more complicated function if need be. This dataset represents the loss as a function of time that is included in the frequency-scanned data, but is solely due to sample constituents that are not germane to the desired measurement.

Then for each point in the frequency-scanned data set, the time stamp associated with that point is used to interpolate between interference measurements and estimate the instantaneous loss from interference at the time when the ring-down measurement was made. Subtracting the interference loss from the total measured loss generates a corrected spectrum that is much less sensitive to changing unstructured absorption than the conventional CRDS spectrum.

The analysis of the corrected spectrum then proceeds exactly as for the uncontaminated conventional spectrum: comparison of measured absorption with a spectral model that describes absorption by the analyte and any other molecules that can contribute to frequency-dependent optical absorption allows the absorption and hence the concentration of the analyte to be deduced.

DETAILED DESCRIPTION

Figure 1A:
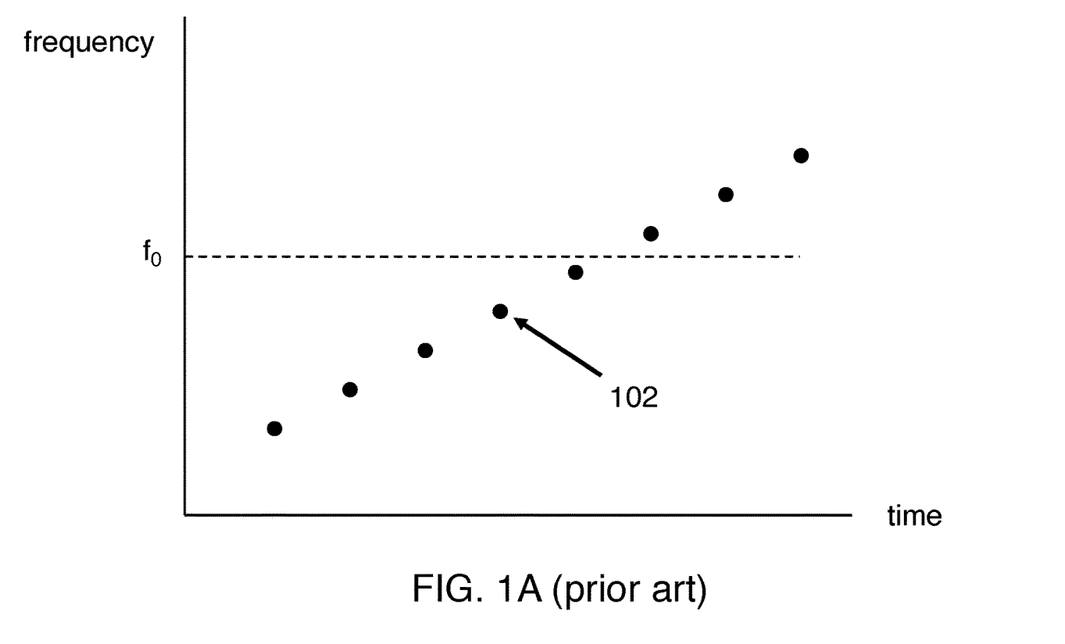
FIG. 1A schematically shows a conventional CRDS data acquisition.
Figure 1B:
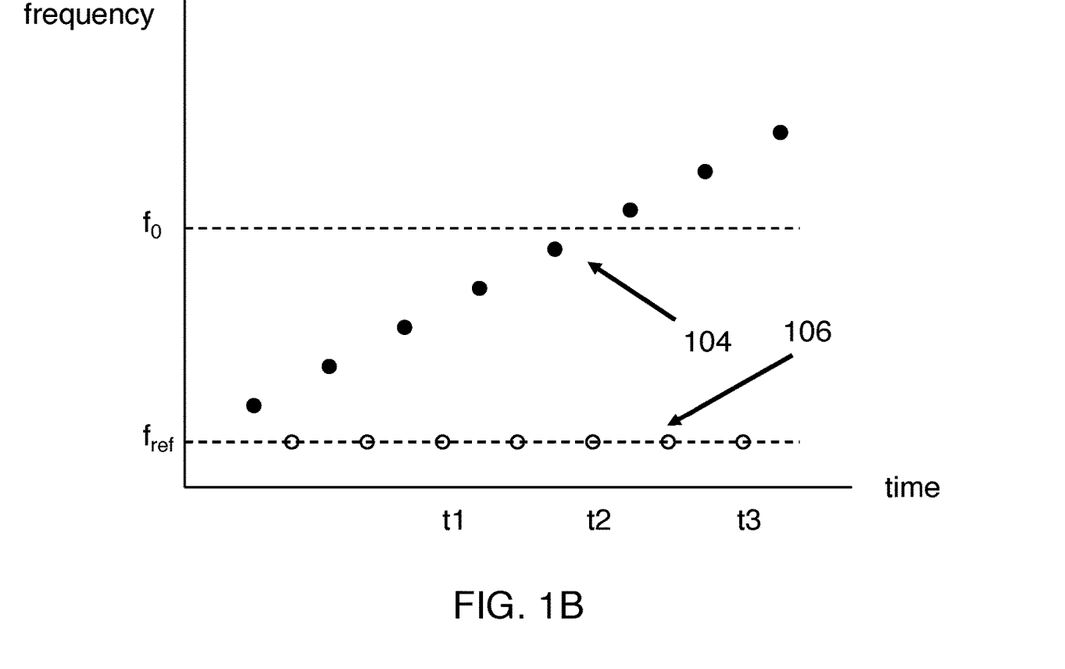
FIG. 1B shows data acquisition according to an embodiment of the invention.

FIGS. 1A-B are simple graphical representations of the sequence of ring-down acquisitions in conventional frequency-swept CRDS (FIG. 1A) vs. the present approach (FIG. 1B). FIG. 1A shows the conventional method of sequentially acquiring loss data 102 at frequencies about a molecular absorption line or other absorption feature. Here the frequency $f_0$ represents the frequency of peak absorption of the analyte of interest. After the entire data set has been acquired, a plot of loss vs. optical frequency might show a typical absorption line, provided that the interference is constant during the data acquisition interval. If the interference varies in time, then the acquired data will be a distorted version of the absorption line.

FIG. 1B represents the order of ring-down data as acquired in an exemplary version of the present approach. Again $f_0$ represents the frequency of peak absorption, and in addition $f_{ref}$ represents the reference frequency. Solid circles 104 and open circles 106 represent the frequency-scanned and interference data sets respectively. From the interference data set with its time stamps, it is possible to estimate the changing interference for each of the frequency-scanned points and thereby generate an absorption spectrum that is insensitive to variable interfering absorption.

To present the idea clearly, the sketch in FIGS. 1A-B is a greatly simplified approximation of a practical spectrum acquisition. To improve signal-to-noise it is generally advantageous to acquire many more frequency-scanned ring-downs per spectrum than the few points shown here. In addition, it is not necessary in general to alternate one-by-one between frequency-scanned and interference measurements, as shown in FIG. 1B. If the time between ring-down measurements is small enough compared to the time scale on which the cavity interference loss varies, fewer interference measurements may suffice to characterize the interference loss as a function of time with adequate precision to generate the corrected spectrum. In this case, it is possible to make more than one frequency-scanned ring-down measurement per interference measurement, thereby increasing the fraction of time that the spectrometer is measuring the analyte rather than the interference.

Figure 2A:
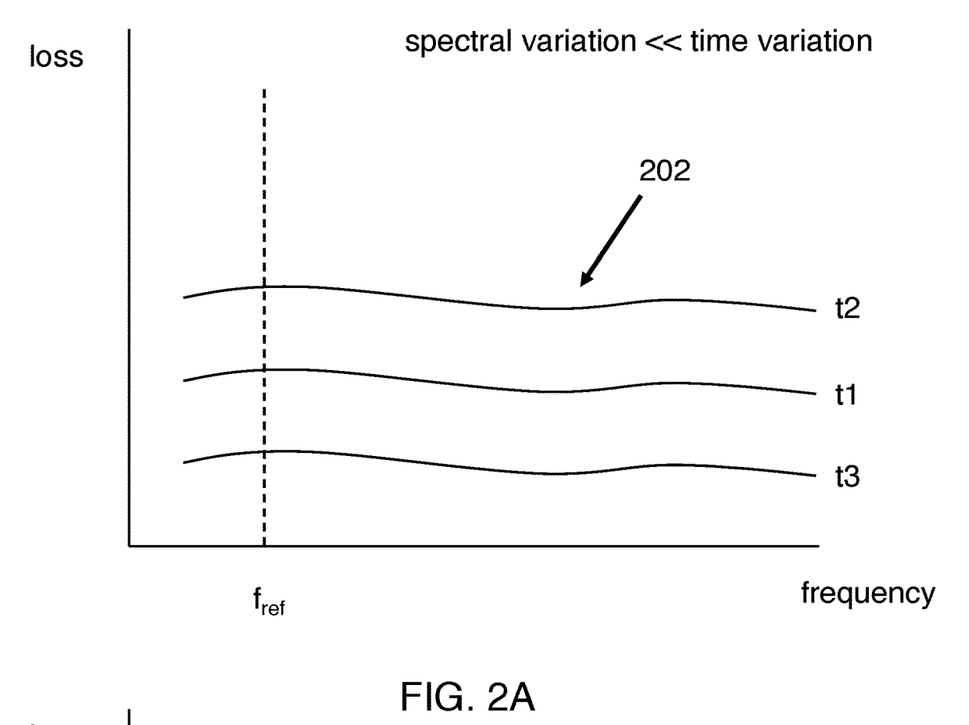
FIGS. 2A-C show a first example of interference correction.
Figure 2B:
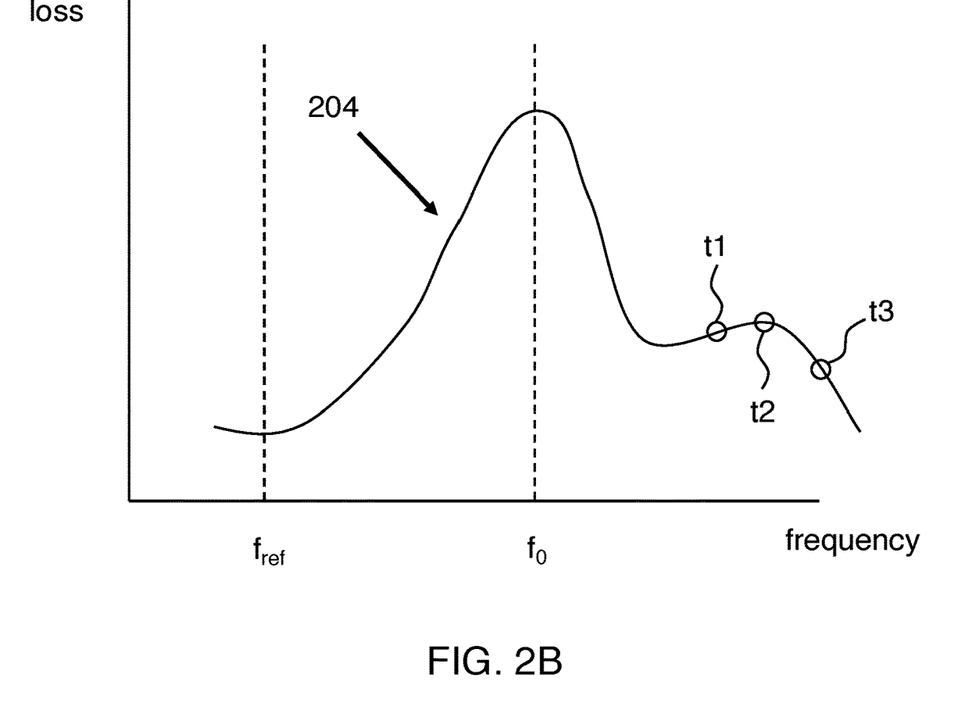
Figure 2C:
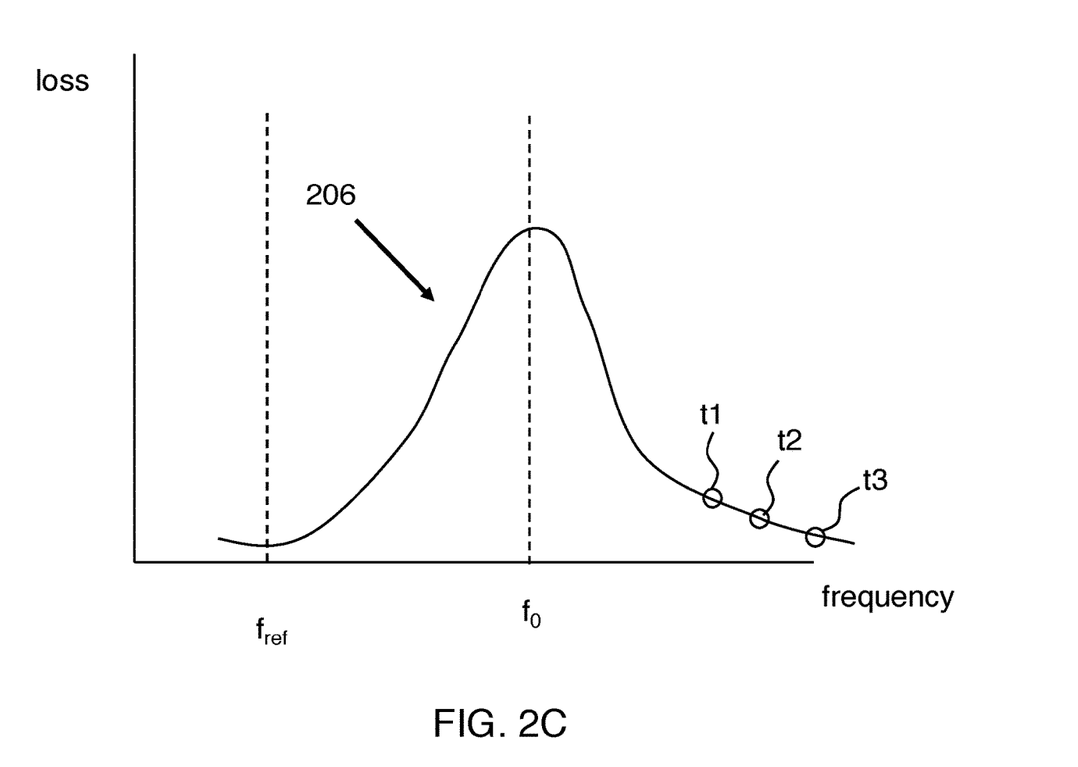

FIGS. 2A-C schematically show how the approach of FIG. 1B can work in the case of unstructured interference. FIG. 2A schematically shows unstructured interference 202 having a time variation (i.e., difference between interference at times t1, t2, t3) that is more significant than its spectral variation (i.e., loss vs. frequency is nearly flat at all times). Thus interference loss measurements at a single reference frequency $f_{ref}$ can provide useful information on interference vs. time at all frequencies. Here we assume the spectral variation of the interference can be neglected, either because it is intrinsically small and/or because the spectral variation of the interference is less significant than its time variation.

To quantify these various effects, consider an optical cavity operating at N ringdown events per spectral scan, with variability $V_m$ in the measurement of the optical loss per event (under ideal conditions with no variability in the gas concentrations). Typically, N is 25-10,000 events, and $V_m$ is 0.02 to $20 \times 10^{-9}$/cm of path of loss. If we consider the simple example in which about half the loss measurements in a spectral scan are used to determine the off-resonance loss of the system (with the remaining ringdowns devoted to measuring the peak(s) of the analyte spectrum), the uncertainty in the determination of the off-resonance loss is approximated by $v_m = V_m/\text{sqrt}(N)$, which ranges from 0.0002 to $4 \times 10^{-9}$/cm. Further, consider the situation where the spectral variability of the interference (in units of cavity loss) is $v_s$, and the temporal variability of the interference in these same units is $v_t$. A significant variation in either $v_t$ or $v_s$ is therefore when these quantities become large (e.g., $2 \times$ or more) relative to $v_m$.

FIG. 2B shows an exemplary result 204 of a conventional CRDS data acquisition in the presence of the interference of FIG. 2A. Here $f_0$ is the spectral peak of an analyte of interest, and it is assumed that the circled data points in 204 are acquired at the times indicated. Since the interference at t2 is greater than the interference at t1 or t3, this can lead to a spurious peak in result 204, as shown.

FIG. 2C shows the result of correcting result 204 of FIG. 2B using an interleaved data acquisition as described above. Here the spurious peak at time t2 is removed from the corrected result 206 by subtracting off the time varying interference (which is assumed to be frequency independent).

Figure 3A:
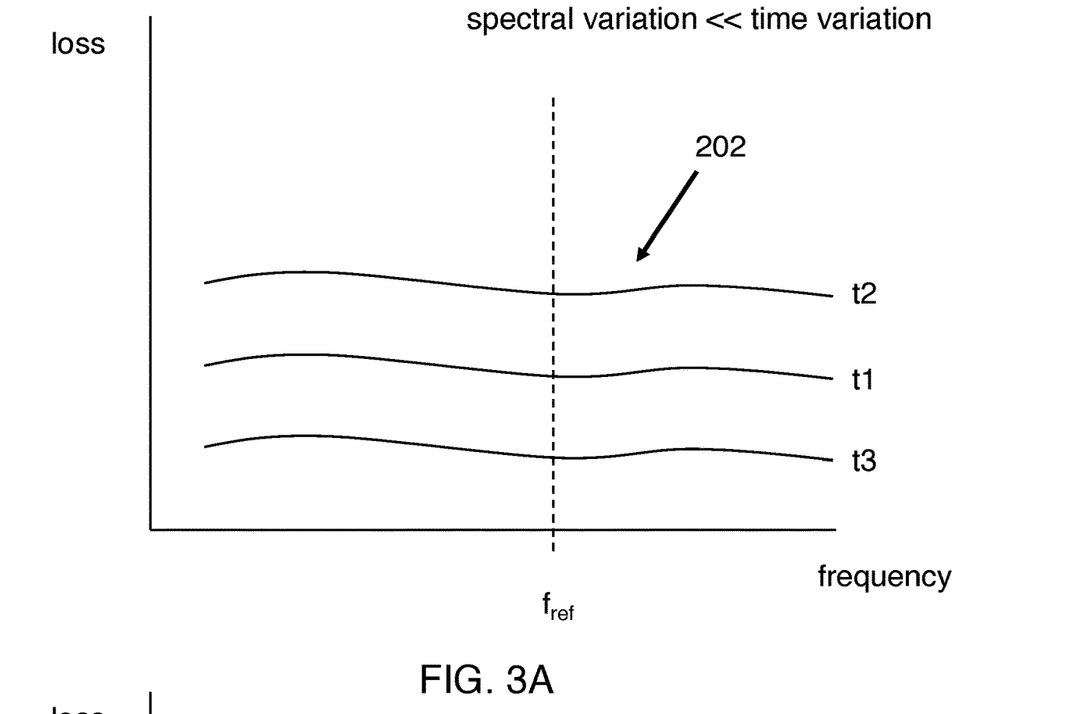
FIGS. 3A-C show a second example of interference correction.
Figure 3B:
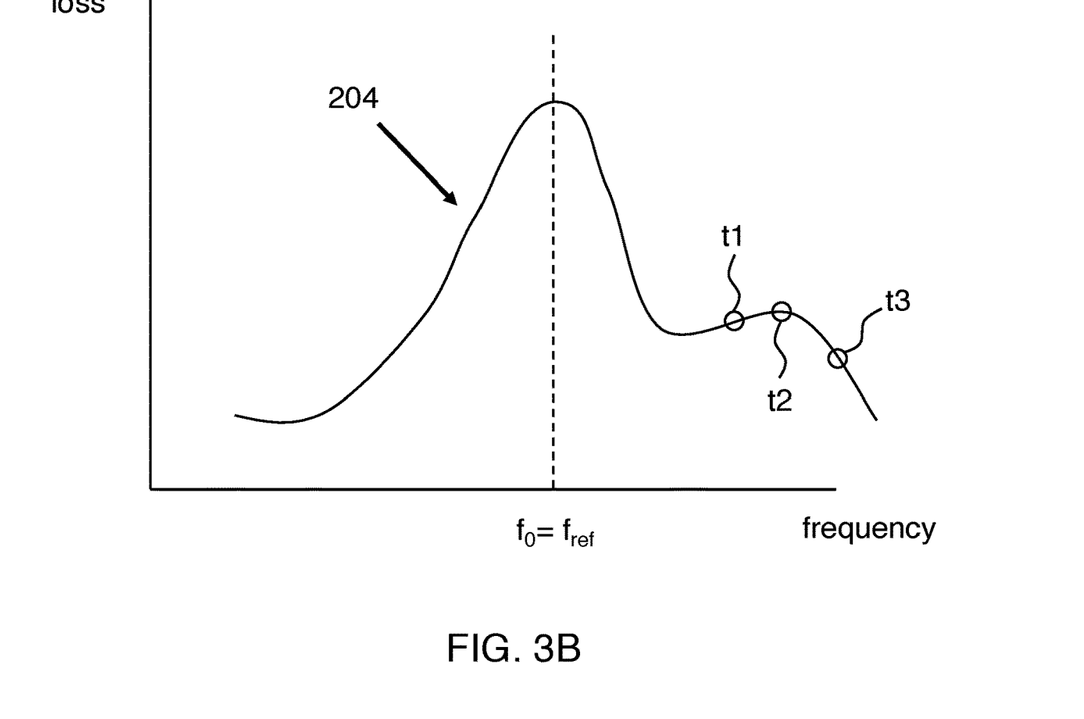
Figure 3C:
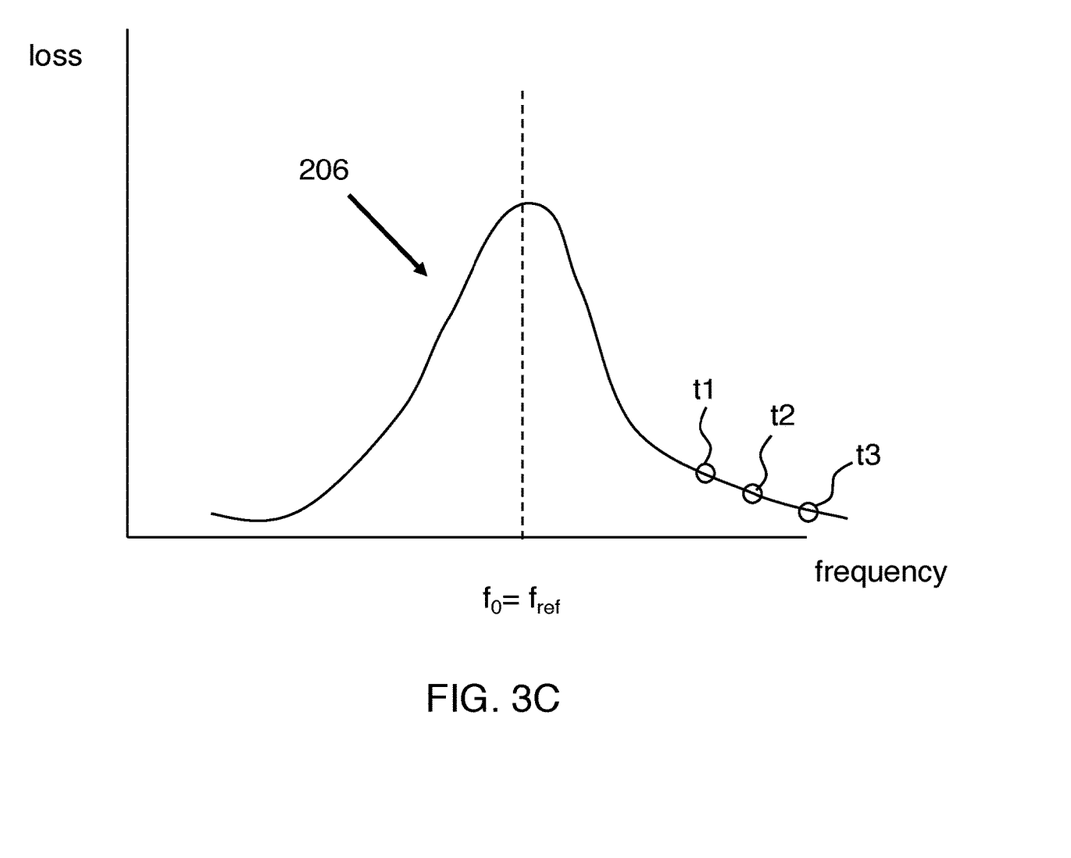

Since unstructured interference is assumed to be frequency independent, it does not matter what frequency is chosen to be the reference frequency $f_{ref}$. Sometimes it is desirable to choose $f_{ref}$ to be at or near $f_0$, the frequency of a peak of the analyte of interest. FIGS. 3A-C show this situation, with the logic of the correction being exactly the same as on FIGS. 2A-C. Correcting the spectrum with this time series also works quite well, and has the advantage that more measurements are placed on the peak, which reduces the uncertainty in the overall analyte concentration determination (where you want to place about half of your spectral points on the peak and half on the baseline for optimal statistics). However, we note that if the analyte and the unstructured interference are time-varying in a significant manner, it can be difficult to untangle the two effects unambiguously.

Accordingly, an exemplary embodiment of the invention is a method of performing optical absorption spectroscopy where the method includes: providing an optical absorption instrument having a tunable optical source; and performing optical absorption measurements of one or more analytes in a sample with the optical absorption instrument in a time-sequential series of measurements having interleaved first measurements (e.g., 106 on FIG. 1B) and second measurements (e.g., 104 on FIG. 1B and 204 on FIG. 2B), where each of the first and second measurements includes at least a time stamp, an optical source frequency, and an optical loss. Because the measurement data points each include loss, time and frequency, it is possible for the second measurements to be represented by frequency-time relation 104 on FIG. 1B and by loss-frequency relation 204 on FIG. 2B.

Here 'interleaved' refers to any interleaved pattern of data acquisition of the first and second measurements. Between any two consecutive first measurements, there can be zero or more second measurements. Similarly, between any two consecutive second measurements, there can be zero or more first measurements. In cases with groups of one kind of measurement separating groups of the other kind of measurement, the number of measurements in each successive group can be the same or they can be different. Accordingly, the first and second measurements can be interleaved such that one or more second measurements are made between each consecutive pair of first measurements. More generally, the first and second measurements can be interleaved such that alternating sets of first and second measurements each independently contain one or more measurements.

All of the first measurements are performed at a reference frequency $f_{ref}$ of the optical source. The second measurements include measurements performed at two or more optical source frequencies other than $f_{ref}$. The second measurements may or may not include measurements performed at $f_{ref}$. An interference optical loss spectrum vs. time is determined from the first measurements and from an interference spectral model. The second measurements 204 are corrected using the interference optical loss spectrum vs. time to provide interference-corrected second measurements (e.g., 206 on FIG. 2C). This is normally followed by performing quantitative analysis of the interference-corrected second measurements with spectral curve fitting to determine concentrations of the one or more analytes in the sample.

In the examples of FIGS. 2A-C and 3A-C, the interference spectral model is frequency-independent interference. In the example of FIGS. 2A-C, the reference frequency $f_{ref}$ is at a frequency away from spectral peaks of any constituents of the sample. Correcting the second measurements is done by directly subtracting interference at $f_{ref}$ vs. time from the second measurements. In the example of FIGS. 3A-C, the reference frequency $f_{ref}$ is at a frequency of a spectral peak of a selected constituent of the sample. Here this constituent is an analyte of interest. Here also, correcting the second measurements is done by directly subtracting interference at $f_{ref}$ vs. time from the second measurements.

Figure 4A:
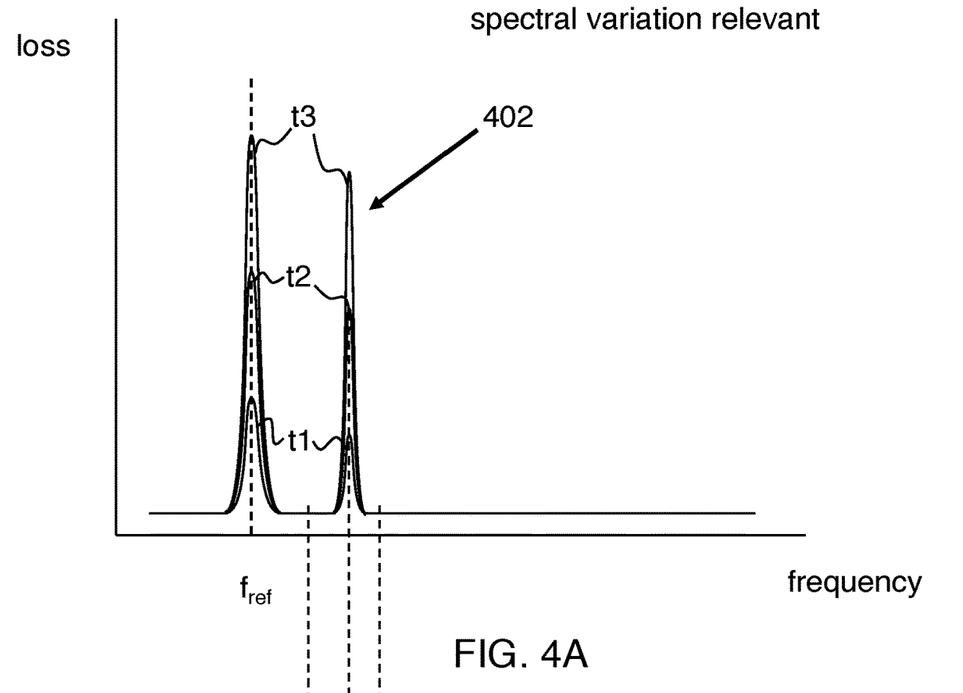
FIGS. 4A-C show a third example of interference correction.
Figure 4B:
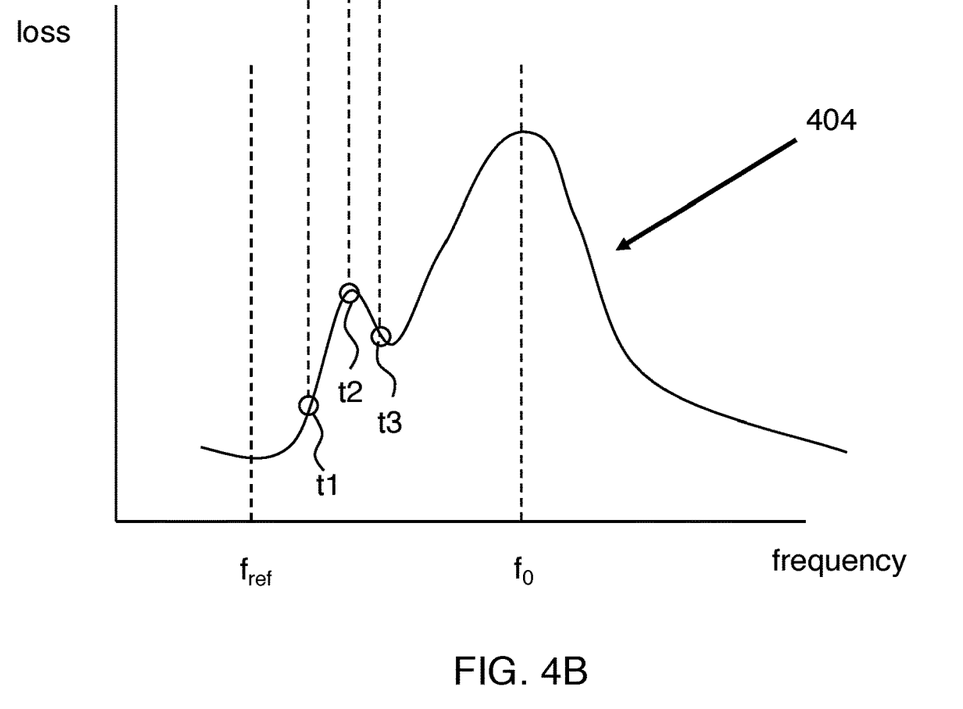
Figure 4C:
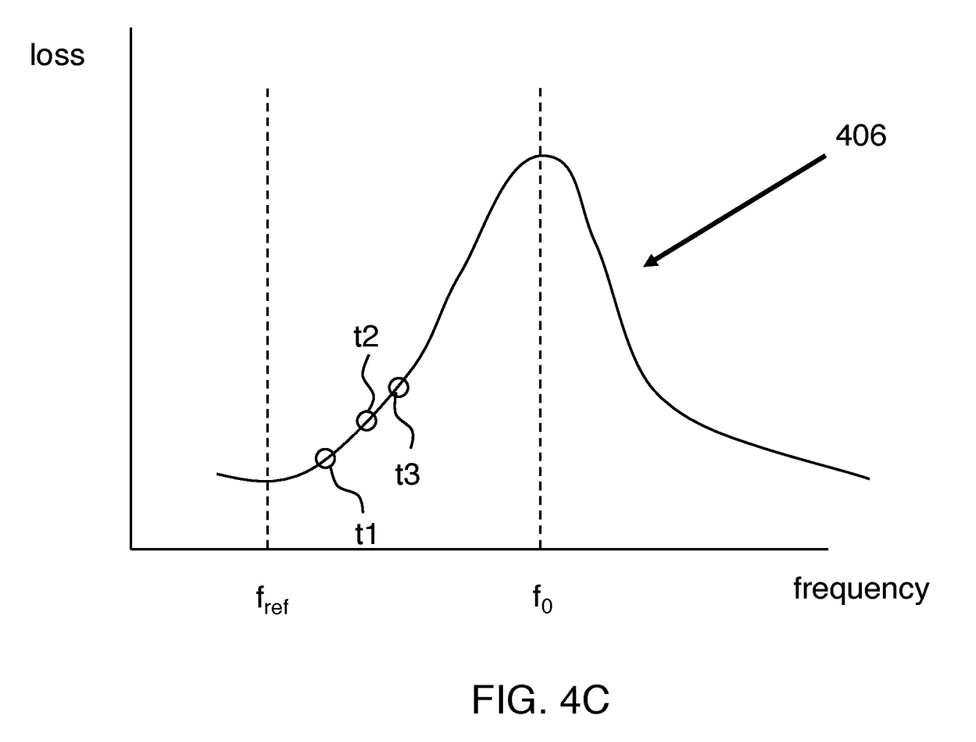

Interleaved data acquisition as described above can also be used in cases of structured interference. FIGS. 4A-C show an example of how this can work out. Here FIG. 4A shows structured interference 402, which is assumed to increase from t1 to t2 to t3 as shown. The interference is also assumed to have two spectral peaks, and $f_{ref}$ is placed on one of these peaks, also as shown. FIG. 4B shows a possible result this kind of interference can have on a CRDS acquisition. Here again it is assumed that the circled data points in second measurements 404 are acquired at the times indicated. Here we see that the spurious peak in FIG. 4B is at time t2, despite the higher interference at t3 than at t2, because of the spectral dependence of interference 402. Accordingly, to get a properly corrected result 406 on FIG. 4C, the correction needs to account for the spectral dependence of interference 402.

In the embodiment of FIGS. 4A-C, the reference frequency $f_{ref}$ is at a frequency of a spectral peak of a selected constituent of the sample. Here that constituent is a interfering chemical species, and the interference spectral model is a constituent spectral model of the selected constituent of the sample. Correcting the second measurements is done by scaling the constituent spectral model according to the first measurements to provide a scaled spectral model vs. time and subtracting the scaled spectral model vs. time from the second measurements. More explicitly, let the constituent spectral model be M(f). Then the scaled spectral model vs. time is M(t,f)=a(t)M(f) where a(t) is determined by requiring that M(t,$f_{ref}$)=B(t) the first measurements. Let the second measurements be D($t_i$,$f_i$). Here i is an index for the second measurement data points. Then the corrected results C($t_i$,$f_i$)= D($t_i$,$f_i$)−M($t_i$,$f_i$). Interpolation in time and/or frequency is performed as needed in these calculations. For example, time interpolation amounts to constructing an interpolating function of the first measurements to permit estimation of the first measurements at times other than times of the first measurement data points. In the examples of FIGS. 2A-C and 3A-C, M(f)=a constant, which reduces to a direct subtraction of the first measurements from the second, as previously described.

In cases where multiple different interfering constituents are relevant, reference data can be acquired at two or more reference frequencies, each reference frequency corresponding to one of the interfering constituents. We first consider the situation where the loss at each of the reference frequencies is each influenced by just one interfering constituent. In that case, each of the measurements $M_k$ at reference frequencies $f_{ref,k}$ can be decomposed in the same manner as described above, where $M_k(t,f)=a_k(t)M_k(f)=B_k(t)$, where the $B_k(t)$ are the time series measurements of loss collected at $f_{ref,k}$. Then corrections as described above can be individually performed for each interfering species.

A second, more complex situation is when the loss at each of the reference frequencies is influenced by two or more of the interfering constituents. In this case, we have a system of equations connecting the reference measurements B and the model functions M. If we assume that there are J interfering constituents, and an equal number of reference frequencies, we can construct the following matrix expression:

$$A_j(t)M_j(f_{k,ref})=B(f_{k,ref},t)$$

In this expression, $A_j(t)$ is a rectangular matrix with column vectors $a_j(t)$ corresponding to the concentration time series of the individual analytes; $M_j(f_{k,ref})$ is a square matrix where each row is a model function of analyte j evaluated at $f_{k,ref}$; and $B(f_{k,ref}, t)$ is a rectangular matrix of the measured losses at each reference frequency as a function of time. We can solve for the concentration time series $A_j(t)$ by right matrix multiplication of $M^{-1}$, or $$A = B * M^{-1},$$

provided that the matrix M is non-singular; i.e., that none of the model functions of any constituent can be expressed as a linear combination of the other model functions. The set of concentration time series A can then be used to correct the second set of measurements D by $C=D-A*M$. Note that if M is a diagonal matrix, this case reduces to the simpler case described above. We can also extend this formalism to situations where there are unequal numbers of reference frequency measurements K vs constituent molecules J. There are various methods in linear algebra for solving such a system of equations. One method involves first right-multiplying by the transpose of the K×J rectangular matrix M, and then right multiplying by the inverse of the product between M and its own transpose, resulting in:

$$A = B * M^T * (M * M^T)^{-1}$$

Again, the corrected time series can be created in the same manner as described above. When there are more reference frequencies than interferences (K>J), there is more data than are needed to uniquely determine the concentration time series. The method described above determines the optimized concentration time series in a least squares sense, given the data set B and model functions. When K<J, there is insufficient information to uniquely determine the concentration time series, and some other criterion or set of criteria must be applied to determine a unique solution for the concentration time series.

Preferably, the optical source is a current-tuned semiconductor laser. Most other tunable laser sources do not provide the rapid and precise tuning capability of semiconductor lasers. The preceding examples all assume the spectroscopy method being employed is cavity ring-down spectroscopy. However, this approach is applicable for any optical spectroscopy approach where frequency data points are acquired sequentially in time.

In cases where CRDS is the spectroscopy method employed, there are some further practical considerations of preferred embodiments. When the level of the interference and the analyte varies over wide ranges, the precision of the loss measurements in CRDS will depend on how well the analyzer can perform under conditions of high loss. In a typical cavity ring-down spectrometer, the ring-down rate decreases markedly as the loss rises since the cavity is no longer being filled efficiently. In such situations, the peak level of optical power observed on the ringdown detector is reduced. Since the present method depends on making loss measurements closely spaced in time to allow for the accurate subtraction, it is important that an adequate ring-down rate be maintained. By decreasing the threshold photodetector voltage at which a ring-down is initiated (the ringdown threshold), the precision of the individual loss measurements is degraded, but the corresponding increase in ringdown rate compensates for this, improving the overall quality of the measurement when compared to using a fixed threshold. We have found it useful to implement a dynamic control algorithm, in which the ringdown threshold is reduced when the ring-down rate falls below a preset value, and the higher ringdown threshold is restored once the loss at all measured frequency points are sufficiently low that adequate cavity filling is assured. This allows high precision to be maintained under normal operating conditions of trace analyte levels and low interference, but for performance to degrade gracefully as either of these conditions is violated.

Figure 5:
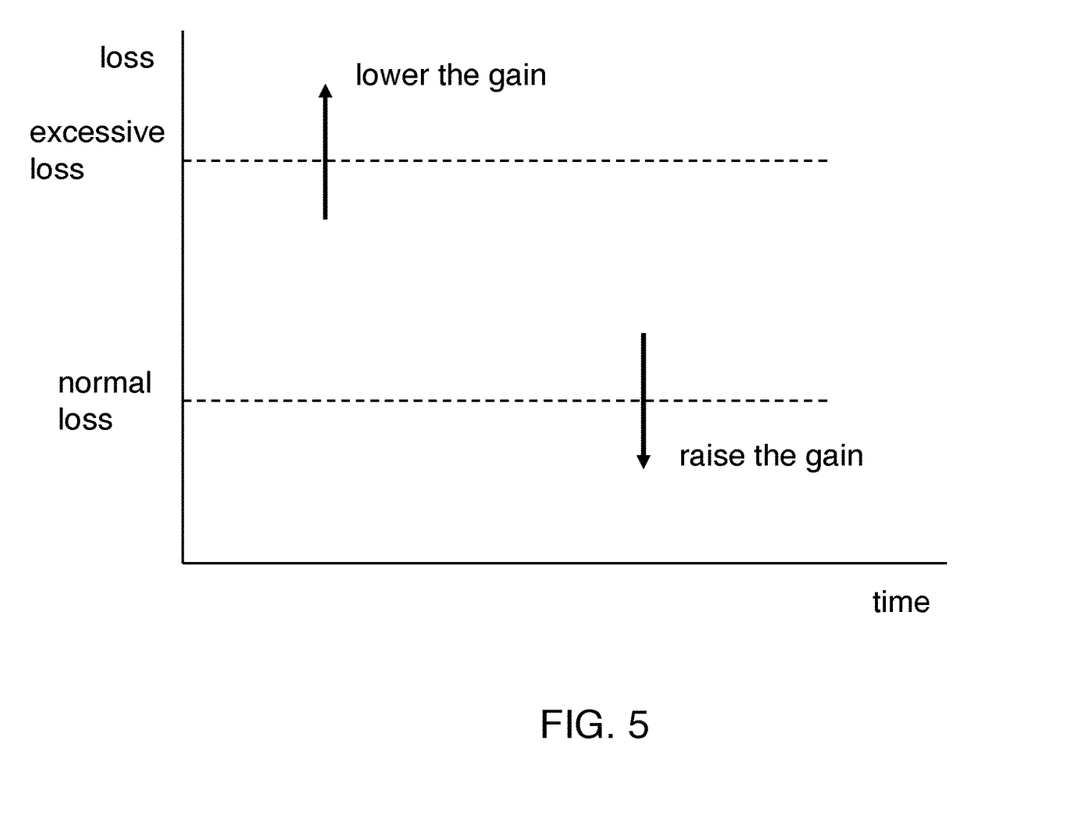
FIG. 5 schematically shows a preferred approach for setting CRDS instrument detector gain.

Accordingly, the threshold for initiating ringdowns in the CRDS instrument is preferably dynamically lowered if a ringdown rate falls below a predetermined value. The ringdown threshold of the CRDS instrument can be lowered when a predetermined excessive loss value is exceeded. The ringdown threshold of the CRDS instrument can be raised when cavity loss goes below a predetermined normal loss value. Preferably, the excessive loss value substantially exceeds the normal loss value. This builds hysteresis into the system so that it doesn't rapidly toggle between ringdown threshold levels when the instrument is sampling a regime of intermediate contamination. FIG. 5 schematically shows this preferred approach, where ringdown threshold is lowered if 'excessive loss' is exceeded, ringdown threshold is increased if the loss goes below 'normal loss', and there is a substantial gap between the 'excessive loss' and 'normal loss' values.

We note that the above outcome could be accomplished by changing the electronic gain of the photodetector rather than the ringdown threshold. If we were to raise or lower the detector gain rather than lower or raise the ringdown threshold, respectively, using the same excessive and normal loss values, the performance of the system would be similar to that described above.

The invention claimed is:

1. A method of performing optical absorption spectroscopy, the method comprising:
    providing an optical absorption instrument having a tunable optical source;
    performing optical absorption measurements of one or more analytes in a sample with the optical absorption instrument in a time-sequential series of measurements having interleaved two or more first measurements and two or more second measurements, wherein each of the first and second measurements includes at least a time stamp, an optical source frequency, and an optical loss;
    wherein all of the two or more first measurements are performed at a reference frequency $f_{ref}$ of the optical source;
    wherein the two or more second measurements include measurements performed at two or more optical source frequencies other than $f_{ref}$;
    determining an interference optical loss spectrum vs. time from the two or more first measurements and from an interference spectral model; and
    correcting the two or more second measurements using the interference optical loss spectrum vs. time to provide interference-corrected second measurements.

2. The method of claim 1, wherein the interference spectral model is frequency-independent interference.

3. The method of claim 2,
    wherein the reference frequency $f_{ref}$ is at a frequency away from spectral peaks of any constituents of the sample; and
    wherein correcting the two or more second measurements comprises directly subtracting interference at $f_{ref}$ vs. time from the second measurements.

4. The method of claim 2,
    wherein the reference frequency $f_{ref}$ is at a frequency of a spectral peak of a selected constituent of the sample; and
    wherein correcting the two or more second measurements comprises directly subtracting interference at $f_{ref}$ vs. time from the second measurements.

5. The method of claim 1,
wherein the reference frequency $f_{ref}$ is at a frequency of a spectral peak of a selected constituent of the sample;
wherein the interference spectral model is a constituent spectral model of the selected constituent of the sample and
wherein correcting the two or more second measurements comprises scaling the constituent spectral model according to the two or more first measurements to provide a scaled spectral model vs. time and subtracting the scaled spectral model vs. time from the two or more second measurements.

6. The method of claim 1, wherein the tunable optical source is a current-tuned semiconductor laser.

7. The method of claim 1, wherein the two or more first measurements and the two or more second measurements are interleaved such that one or more second measurements are made between each consecutive pair of first measurements.

8. The method of claim 1, wherein the two or more first measurements and the two or more second measurements are interleaved such that alternating sets of first and second measurements each independently contain one or more measurements.

9. The method of claim 1, wherein the optical absorption instrument is a cavity ring-down spectroscopy (CRDS) instrument.

10. The method of claim 9, wherein a threshold for initiating ringdowns in the CRDS instrument is dynamically lowered if a ringdown rate falls below a predetermined value.

11. The method of claim 10, further comprising lowering a detector gain of the CRDS instrument when a predetermined excessive loss value is exceeded.

12. The method of claim 11, further comprising raising the detector gain of the CRDS instrument when cavity loss goes below a predetermined normal loss value.

13. The method of claim 12, wherein the excessive loss value substantially exceeds the normal loss value.

14. The method of claim 1, further comprising performing quantitative analysis of the interference-corrected second measurements with spectral curve fitting to determine concentrations of the one or more analytes in the sample.

15. The method of claim 1, further comprising constructing an interpolating function of the two or more first measurements to permit estimation of the two or more first measurements at times other than times of first measurement data points.

* * * * *